(12) United States Patent
Cortada Acosta

(10) Patent No.: US 9,793,766 B2
(45) Date of Patent: Oct. 17, 2017

(54) STATOR ASSEMBLY FOR A WIND TURBINE GENERATOR

(71) Applicant: Alstom Renovables España, S.L., Barcelona (ES)

(72) Inventor: Pere Cortada Acosta, Sant Cugat del Vallès (ES)

(73) Assignee: ALSTOM Renewable Technologies, Grenoble (FR)

( * ) Notice: Subject to any disclaimer, the term of this patent is extended or adjusted under 35 U.S.C. 154(b) by 275 days.

(21) Appl. No.: 14/362,905

(22) PCT Filed: Jan. 25, 2013

(86) PCT No.: PCT/EP2013/051428
§ 371 (c)(1),
(2) Date: Jun. 4, 2014

(87) PCT Pub. No.: WO2013/110751
PCT Pub. Date: Aug. 1, 2013

(65) Prior Publication Data
US 2014/0361546 A1 Dec. 11, 2014

Related U.S. Application Data

(60) Provisional application No. 61/616,114, filed on Mar. 27, 2012.

(30) Foreign Application Priority Data

Jan. 27, 2012 (EP) .................... 12382028

(51) Int. Cl.
*H02K 1/18* (2006.01)
*H02K 1/14* (2006.01)
(Continued)

(52) U.S. Cl.
CPC ............. *H02K 1/187* (2013.01); *F03D 9/25* (2016.05); *H02K 1/148* (2013.01); *H02K 7/1838* (2013.01); *Y02E 10/725* (2013.01)

(58) Field of Classification Search
CPC ...... H02K 1/148; H02K 1/187; H02K 7/1838; H02K 1/14; B60L 11/1803; B60L 2220/44; Y03T 10/641; Y03T 10/7005
(Continued)

(56) References Cited

U.S. PATENT DOCUMENTS 4,866,321 A 9/1989 Blanchard et al.
5,355,039 A * 10/1994 Couture ............... B60K 7/0007
310/67 R
(Continued)

FOREIGN PATENT DOCUMENTS

DE 100 33 233 1/2002
EP 2063115 5/2009
(Continued)

OTHER PUBLICATIONS

International Search Report and Written Opinion for PCT/EP2013/051428, dated Jan. 2, 2014, 11 pgs.

*Primary Examiner* — Joshua Benitez-Rosario
*Assistant Examiner* — Leda Pham
(74) *Attorney, Agent, or Firm* — Dority & Manning, P.A.

(57) ABSTRACT

It comprises stator segments forming a stator structure and a transverse structure connected to the stator structure and arranged between at least two stator segments. The transverse structure may have reinforcing ribs extending therealong and a handling device at longitudinally opposite portions of the transverse structure. A wind turbine generator comprising a rotor and said stator assembly and a wind turbine comprising such a generator are also provided.

8 Claims, 4 Drawing Sheets

(51) Int. Cl.
*H02K 7/18* (2006.01)
*F03D 9/25* (2016.01)

(58) Field of Classification Search
USPC .... 310/216.007, 216.009, 216.028, 216.049, 310/216.058, 216.113
See application file for complete search history.

(56) References Cited

U.S. PATENT DOCUMENTS

| | | | |
|---|---|---|---|
| 5,844,341 | A | 12/1998 | Spooner et al. |
| 6,762,520 | B1* | 7/2004 | Ehrhart .................. H02K 1/20 310/208 |
| 2004/0101398 | A1 | 5/2004 | Wobben |
| 2004/0160141 | A1* | 8/2004 | Dube .................... H02K 1/148 310/216.028 |
| 2007/0096586 | A1* | 5/2007 | Cros .................. B60L 11/1803 310/216.059 |
| 2007/0284959 | A1 | 12/2007 | Huppunen et al. |
| 2011/0266909 | A1* | 11/2011 | Lokhandwalla ..... H02K 1/2766 310/156.12 |
| 2012/0080933 | A1* | 4/2012 | Yang ................... B60K 7/0007 301/6.5 |

FOREIGN PATENT DOCUMENTS

| | | |
|---|---|---|
| EP | 2063116 | 5/2009 |
| EP | 2063117 | 5/2009 |
| WO | WO 00/60719 | 10/2000 |
| WO | WO 03/073591 | 9/2003 |
| WO | WO 2011/031165 | 3/2011 |

* cited by examiner

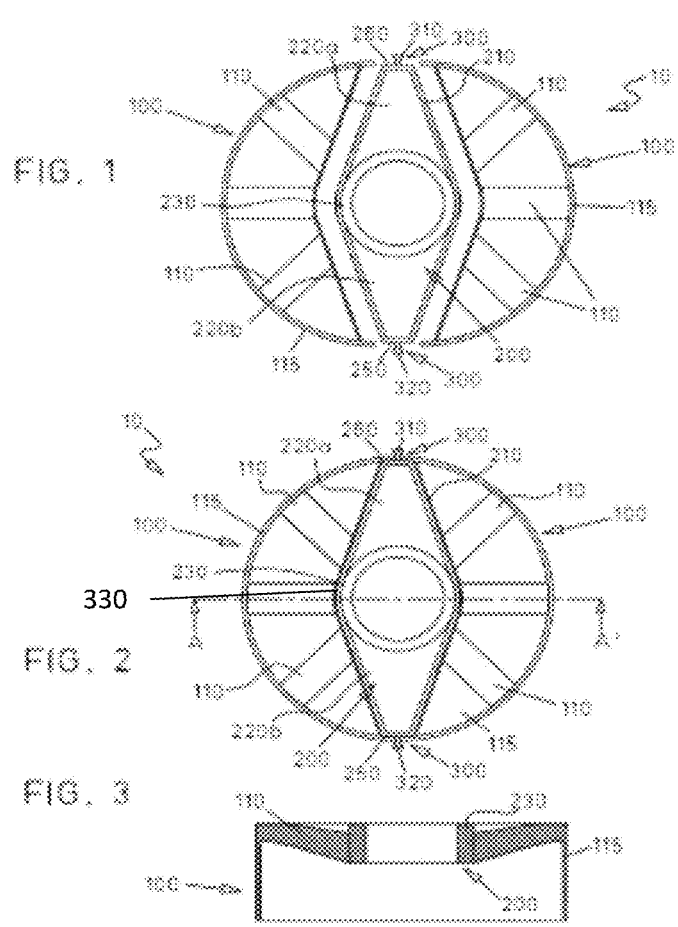

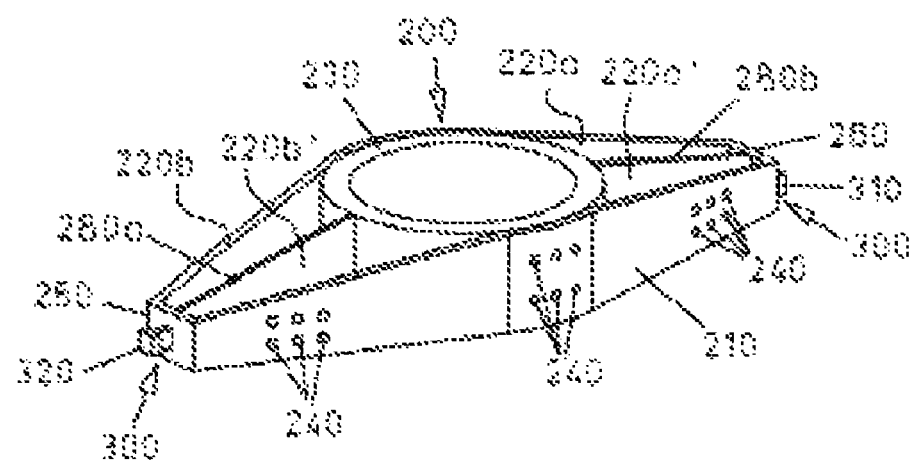
FIG. 8
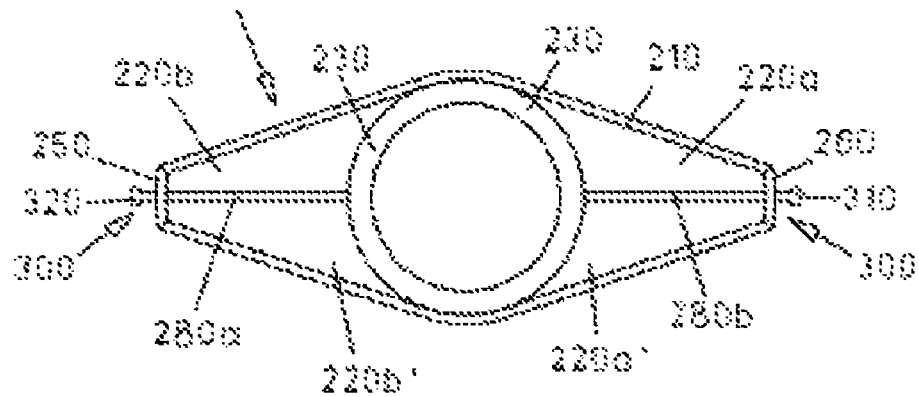
FIG. 9
FIG. 10

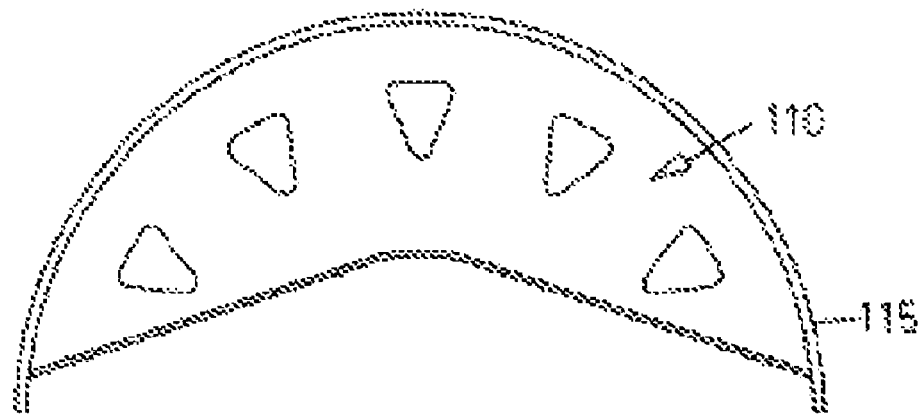
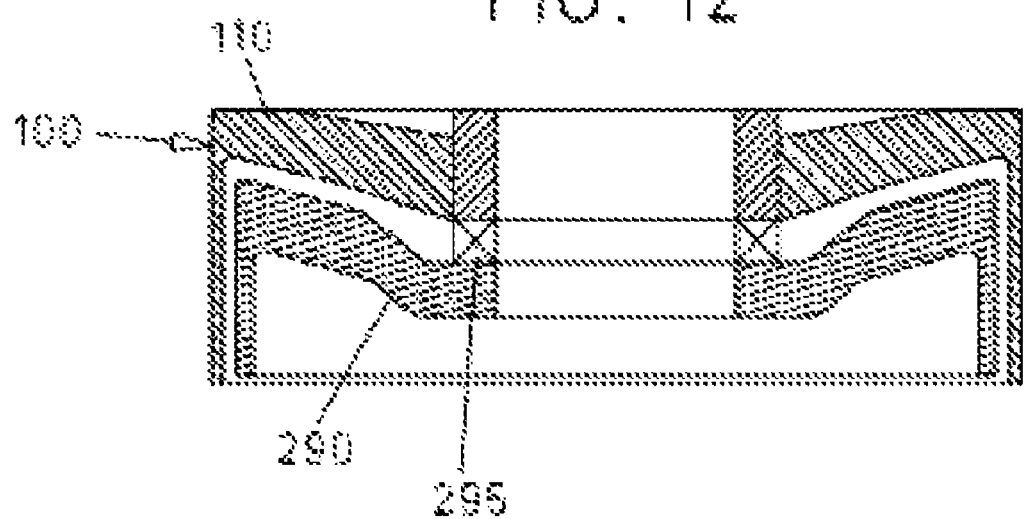

STATOR ASSEMBLY FOR A WIND TURBINE GENERATOR

This application claims the benefit of European Patent Application EP12382028 filed Jan. 27, 2012 and U.S. Provisional Patent Application Ser. No. 61/616,114 filed Mar. 27, 2012.

A stator assembly is disclosed herein. A wind turbine generator comprising said rotor assembly is also disclosed herein. A wind turbine comprising such generator is also disclosed herein.

BACKGROUND

Direct drive wind turbines are known in which the gearbox, which is typically arranged between a main shaft and a generator of the wind turbine, is substituted by a multipolar generator. These types of gearless wind turbines do not make use of a gearbox as the wind rotor is connected directly to the rotor of the wind turbine. For this reason, the multipolar generator is also referred to as a directly driven generator. Directly driven generators may be for example synchronous generators with winded rotor or with permanent magnets arranged on the rotor.

One of the main disadvantages of directly driven generators is that their physical dimensions are relatively large. This makes transport and logistics of such generators complex. In addition, the overall weight of such generators involves additional difficulties, for example in assembling, maintenance and/or repair operations.

To at least partially overcome said disadvantages, it is known in the art to make such generators from segments. The use of modular parts for forming, for example, allows manufacturing, transport and handling operations to be reduced.

Examples of such prior art solutions to the above problem are disclosed in EP2063115 and WO2011031165. These documents refer to directly driven generators for a wind turbine in which the stator and the rotor are both formed of segments in order to facilitate transport operations of the generator.

Although modular generators may be advantageous for transport and maintenance or repair operations, the above prior art solutions have the disadvantage that in order to ensure a sufficient stiffness of the generator to withstand operational conditions the generator structure should be oversized. This undesirably leads to higher costs, which in addition does not lead to a better performance.

SUMMARY

A stator assembly for a generator in a wind turbine comprising a number stator segments forming a stator structure, wherein the stator assembly further includes a transverse structure connected to the stator structure and at least partially arranged between at least two of the stator segments. A wind turbine generator comprising said stator assembly is also disclosed herein. In addition, a wind turbine comprising said generator is also disclosed herein. Advantageous examples are defined in the dependent claims.

The present stator assembly is suitable for large size generators such as those of the direct drive type. The present stator assembly is particularly suitable for synchronous generators with winded rotor or with permanent magnets arranged on the rotor. Other applications are however not ruled out.

The present stator assembly comprises a number stator segments, for example two, each having a specific geometry. Of course more than two stator segments may be provided as necessary.

The stator segments can be made of a suitable size to allow transportation by means of standard transportation means, such as trucks or trailers with a maximum width of 4 m. The stator segments may be, e.g., cylinder segments adapted to be mounted adjacent to each other. In use, the stator segments form a stator assembly having a modular nature. The stator segments may be equal, similar or even different from each other.

The stator assembly further comprises a stator or frame. The stator frame may comprise frame segments as well.

The present stator assembly advantageously includes a transverse structure. This transverse structure may comprise a reinforcing element that may be formed of a single piece. However, the provision of more than one transverse structure each made of a number of reinforcing elements could also be possible.

The transverse structure of the present stator assembly is connected by any suitable means to the stator structure. The transverse structure is at least partially arranged between at least two of the stator segments. Preferably, the transverse structure of the stator assembly is at least partially surrounded by the stator structure and connected as stated above. For this purpose, a connecting device may be provided for removably connecting the transverse structure to the stator structure. The connecting device may be any standard mechanical connecting device which at least may comprise, for example, screws and nuts. Other known mechanical connecting devices may be alternatively or additionally used such as welding, if required.

The connecting device may be provided at any suitable location of the structure, that is, at any suitable point of the transverse structure-stator segments structure. Suitable locations for the connecting device may be, for example, at the opposite ends of the transverse structure and/or a middle portion of the side edges of the transverse structure. Other locations may be of course used for providing the connecting device if required.

However, the preferred embodiment for the connecting device is at the opposite ends of the transverse structure. More specifically, the edges of the stator frame may extend such that when the transverse structure is mounted/attached to the stator segments the whole stator frame completely encircles the transverse structure. The extending edges define a connecting portion for the connecting device. Screws may be provided in this connecting portion arranged lengthwise such that they are under tensile loading when the generator is in operation and they are under shearing stress when in handling operations, such as when arranging the generator horizontal.

Still a further example of the connecting device could be with the transverse structure arranged in an overlapping relationship on the stator structure such that the screws would be arranged axially in a way that they would be under shearing stress when the generator is in operation. Combinations of any of the above examples are possible.

In further examples, the stator assembly may comprise two stator segments and one transverse structure, with the transverse structure being arranged between the stator segments, for example at a central portion of the stator structure. The transverse structure may be arranged at a given position as long as it is provided in a transverse direction to the stator structure.

In this example, the stator segments may be lighter structures as compared with the transverse structure and semi-circular in shape. The stator segments in this specific example would be arranged above and below the transverse structure.

It is preferred that the stator segments are arranged on both sides of the transverse structure, such as surrounding it. However, other examples in which the transverse structure is arranged onto the stator segments or at least in a substantially overlapping relationship are also envisaged.

Again, any other suitable number of stator segments and/or transverse structures according to the above could be provided where necessary.

With the above defined stator assembly both structural features and logistics can be efficiently improved at the same time.

Regarding the improvement of the structural features, stiffening provided with the transverse structure is advantageous when the generator is in use, i.e. during energy generation, as it has been found that the central portion of the stator assembly is subjected to large loads when in use. Since the whole stator assembly is reinforced, a better structural behaviour can be achieved such that the stator assembly is capable of withstanding the required loads. In addition, stiffening provided with the transverse structure is advantageous during manufacturing, handling and installation processes, as well as during transportation as likewise the central portion of the stator assembly is subjected to large loads when handled, transported or installed. Stiffening provided with the transverse structure is advantageous for keeping the size of the air gap inside the stator structure.

Regarding the improvement of logistics, the stator segments can be advantageously transported, installed, repaired and dismantled individually and independently of each other. This results in that the use of large cranes is no longer necessary and the number of operators is reduced. As stated above, since unitary size and weigh are significantly reduced, a standard transportation device can be advantageously used. No specific and expensive transportation devices are therefore required.

The transverse structure may comprise at least one reinforcing rib, for example two reinforcing ribs arranged substantially on opposite side longitudinal edges of the transverse structure. In some examples, the transverse structure may comprise one or more further reinforcing ribs arranged substantially at a middle portion of the transverse structure. Examples having other similar configurations such as for example having only reinforcing ribs substantially at the middle portion of the transverse structure may be provided.

The reinforcing ribs in any of the configurations defined above may extend along the direction defined by two longitudinally opposite portions of the stator structure. For example, for stator structures having a cylindrical configuration, that is, with a circular or substantially circular cross-section, the transverse structure with the reinforcing ribs may extend diametrically thereto. In this way, the reinforcing ribs provide the required stiffness to the whole structure and, in turn, loads are transmitted lengthwise, through the shortest way along the transverse structure.

A handling device may be provided for suitably handling the stator assembly for example when installing it on the generator, e.g. for hoisting the parts, and for performing other operations, such as repair, etc. The handling device may be provided in the transverse structure arranged, for example, integrated at opposite portions of the transverse structure. The handling device may be formed integral with the transverse structure or it may be a removable device.

A wind turbine generator comprising a rotor and the stator assembly as defined above is further provided. The rotor of the present generator may be formed of a single piece or it may have a modular configuration similar to that in the stator. In this respect, the rotor may consist of a rotor assembly formed of a number of rotor segments forming a rotor structure. The above described generator with the stator assembly as disclosed herein has enough stiffness to withstand operational loads during energy generation and also during handling and installation processes, as well as during transportation, as stated above. The above wind turbine generator as defined herein is suitable both for onshore and offshore applications. A wind turbine comprising said generator with is also provided.

Additional objects, advantages and features of examples of the present stator assembly, wind turbine generator and wind turbine will become apparent to those skilled in the art upon examination of the description, or may be learned by practice thereof.

BRIEF DESCRIPTION OF THE DRAWINGS

Particular examples of the present stator assembly, generator and wind turbine will be described in the following by way of non-limiting examples, with reference to the appended drawings.

In the drawings:

FIG. 1 is an elevational view of the present stator assembly in which a first example of stator segments in the form of radially extending arms is shown and in which the stator segments are depicted separated from the transverse structure, before the transverse structure is attached to the stator structure;

FIG. 2 is an elevational view of the present stator assembly with the stator segments connected to the transverse structure;

FIG. 3 is longitudinal cross-sectional view of the stator assembly shown in FIG. 2 taken along line AA' in FIG. 2.

FIG. 8 is a perspective view of a second example of the transverse structure of the present stator assembly;

FIG. 9 is a top plan view of the example of the transverse structure shown in FIG. 8;

FIG. 10 is a longitudinal cross-sectional view of the example of the transverse structure shown in FIGS. 8 and 9;

FIG. 11 is an elevational view of a second example of a stator segment; and

FIG. 12 is a longitudinal cross-sectional view of the stator assembly shown in FIG. 2 taken along line AA' in FIG. 2 with the rotor assembled.

DETAILED DESCRIPTION OF EXAMPLES

Figure 4:
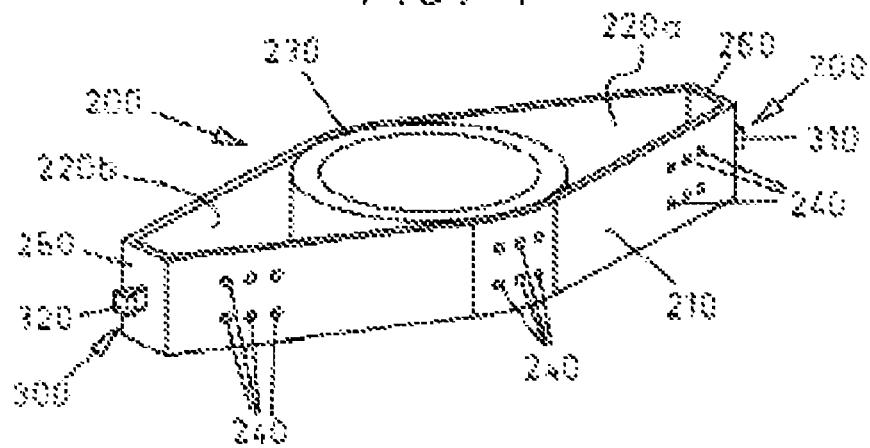
FIG. 4 is a perspective view of a first example of the transverse structure of the present stator assembly.

The figures show examples of a stator assembly for a direct type synchronous generator. The stator assembly has been indicated by reference numeral 10 throughout the drawings. The examples of the stator assembly 10 shown as non-limiting examples in the figures comprise a number of stator segments 110 in the form of radially extending arms. Other configurations for the stator segments 110 are possible, such as for example that depicted in FIG. 11 of the drawings. A predetermined number of stator segments 110 forms a stator structure 100 having a modular nature. Division of stator structure 100 into stator segments 110 facilitates transportation since the unitary size of parts to be transported is advantageously reduced.

The stator segments 110 are semi-cylindrical pieces adapted to be mounted adjacent to each other as shown in the FIGS. 1-3 of the drawings. Although the stator segments 110 are shown as being substantially equal to each other, they may be alternatively similar or different from each other as necessary. A stator frame 115 is carried by the stator segments 110. The stator frame 115 is intended to carry the generator windings (not shown). The stator frame 115 may comprise frame segments as well (not shown). In some examples, the edges of the stator frame 115 could extend such that when the transverse structure 200 is mounted/attached to the stator segments 110 the whole stator frame 115 completely encircles the transverse structure 200.

The stator structure 100 in the example shown further includes a transverse structure 200. The transverse structure 200 is an elongated piece designed to be arranged in a central position across the stator structure 100. The transverse structure 200 is stronger than the stator segments 110 of the stator structure 100.

Figure 5:
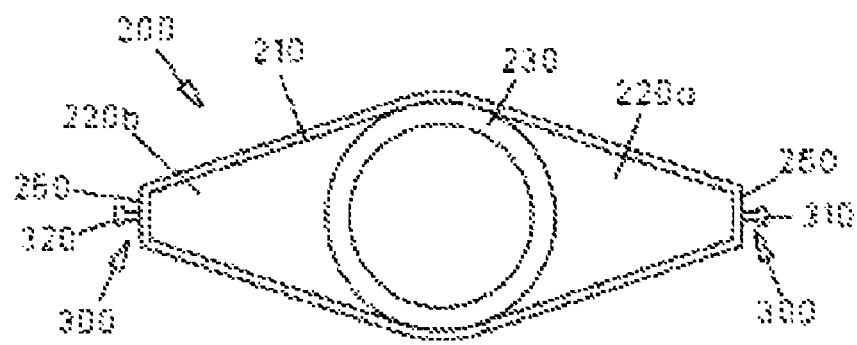
FIG. 5 is a top plan view of the example of the transverse structure shown in FIG. 4.
Figure 6:
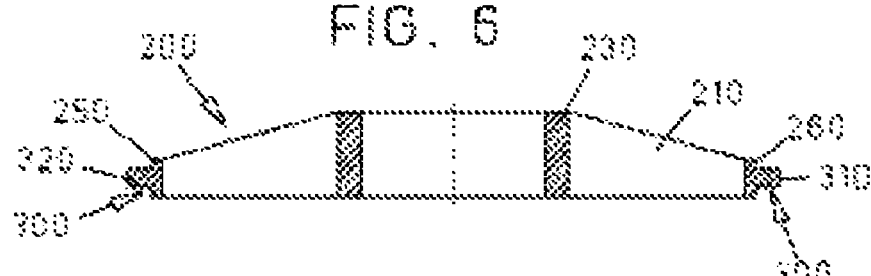
FIG. 6 is a longitudinal cross-sectional view of an example of the transverse structure similar to that shown in FIGS. 4 and 5.

FIGS. 4-10 show examples of the transverse structure 200. Referring now to FIGS. 4-6 of the drawings, the transverse structure 200 comprises a perimetric plate 210. The perimetric plate 210 may be either a single plate or a number of plates connected, e.g. welded, to each other. The perimetric plate 210 may be of a suitable height as required.

The perimetric plate 210 defines two opposite hollow inner regions 220a, 220b separated by a cylindrical element 230 fitted therebetween. The cylindrical element 230 is intended to receive a bearing assembly 295 for the rotor 290 as shown in FIG. 12. The cylindrical element 230 is provided with a flange 330 for attachment to the transverse structure 200.

As shown in FIG. 4, the perimetric plate 210 is provided with a series of holes 240 for receiving screws for connecting, through the use of corresponding nuts, the transverse structure 200 to the stator segments 110 of the stator structure 100. Other locations for holes 240 are also possible, such as for example at longitudinally opposite portions 250, 260 of the transverse structure 200. The stator segments 110 can be thus disassembled from each other and from the transverse structure 200 for repair and maintenance operations.

In use, the transverse structure 200 is connected to and arranged between the stator segments 110 of the stator structure 100 as shown in FIG. 2. That is, in use, the transverse structure 200 is surrounded by the stator structure 100.

Figure 7:
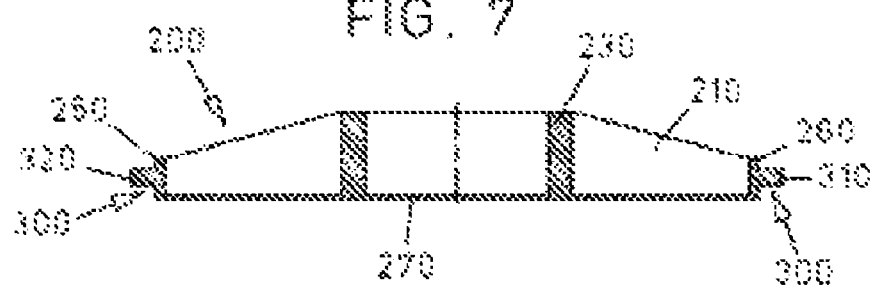
FIG. 7 is a longitudinal cross-sectional view of an alternative example of the transverse structure to that shown in FIGS. 4-6.

In the alternative example of the transverse structure 200 shown in FIG. 7, a bottom plate 270 is provided. The perimetric plate 210 may be integral with the bottom plate 270 or it may be attached thereto. The same applies for the cylindrical element 230 of the transverse structure 200.

Now referring to FIGS. 8-10, a further example of the transverse structure 200 is shown. In this particular example of the transverse structure 200, a reinforcing device is provided for providing the required stiffness to the whole stator structure 100 and, in turn, for transmitting loads lengthwise, through the shortest way along the transverse structure 200. The reinforcing device is divided by the cylindrical element 230 into two parts defining corresponding central reinforcing ribs 280a, 280b as shown in FIGS. 8 and 9. As a result, four inner regions 220a, 220a', 200b, 200b' are defined in this case by the perimetric plate 210, the cylindrical element 230 and the reinforcing ribs 280a, 280b.

In the examples shown in the figures, a handling device 300 is also provided associated with the transverse structure 200. The handling mean 300 are designed for suitably handling the stator assembly 10 for example in installing or repairing operations which may involve e.g. hoisting, displacing, etc. the parts. The handling device 300 in the example shown comprises respective wings 310, 320 formed integral with the transverse structure 200 at the longitudinally opposite portions 250, 260 of the transverse structure 200.

Although only a number of particular examples of the present stator assembly, generator and wind turbine have been disclosed herein, it will be understood by those skilled in the art that other alternative examples and/or uses and obvious modifications and equivalents thereof are possible.

The claims cover all possible combinations of the particular examples described, so the scope should not be limited by particular examples, but should be determined only by a fair reading of the claims that follow.

The invention claimed is:

1. A stator assembly for a wind turbine generator, the stator assembly comprising:
    a number of stator segments extending radially inward from a semi-cylindrical frame, the stator segments and frame forming a stator structure,
    a transverse structure arranged to extend along a diameter of the stator assembly,
    the transverse structure comprising
        a perimetric plate connected to the stator structure, the perimetric plate comprising a continuous closed loop structure that extends across the diameter of the stator assembly, the closed loop structure defining a hollow region,
        a cylindrical element for receiving a bearing assembly, the cylindrical element arranged centrally within the hollow region of the closed loop structure such that the perimetric plate engages at least partially around opposite portions of the cylindrical element and portions of the hollow region are defined at opposite sides of the cylindrical element, and
        a flange attaching the cylindrical element to the perimetric plate,
        the stator segments extending radially inward to the perimetric plate,
    wherein the transverse structure is stronger than the stator segments.

2. A stator assembly as claimed in claim 1, wherein the transverse structure comprises at least one reinforcing rib extending along a direction defined by two longitudinally opposite portions of the perimetric plate.

3. A stator assembly as claimed in claim 2, wherein the transverse structure comprises two reinforcing ribs arranged substantially on opposite side longitudinal edges of the perimetric plate.

4. A stator assembly as claimed in claim 2, wherein the transverse structure comprises the at least one reinforcing rib arranged substantially at a middle portion of the transverse structure.

5. A stator assembly as claimed in claim 1, wherein the transverse structure includes a handling device arranged at longitudinally opposite portions of the transverse structure.

6. A stator assembly as claimed in claim 1, wherein the stator assembly further comprises a connecting device for removably connecting the transverse structure to the stator structure, the connecting device being a single piece connecting device.

7. A wind turbine generator, comprising:
a rotor of the wind turbine, and
the stator assembly according to claim 1.

8. A wind turbine, comprising:
a generator having a rotor, and
the stator assembly according to claim 1.

* * * * *